(12) United States Patent
Gore

(10) Patent No.: US 6,991,329 B2
(45) Date of Patent: Jan. 31, 2006

(54) INKJET PRINTED IMAGES WITH WETTABLE, FUSIBLE TONER

(75) Inventor: Makarand P Gore, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 697 days.

(21) Appl. No.: 09/774,256

(22) Filed: Jan. 29, 2001

(65) Prior Publication Data

US 2002/0140791 A1 Oct. 3, 2002

(51) Int. Cl.
B41M 5/00 (2006.01)

(52) U.S. Cl. ............... 347/105; 427/152; 428/32.1
(58) Field of Classification Search ............ 347/105; 428/32.1; 427/152, 197, 261, 270, 271, 278
See application file for complete search history.

(56) References Cited

U.S. PATENT DOCUMENTS

| 4,312,268 A | 1/1982 | King et al. ............... 101/1 |
| 4,943,816 A | 7/1990 | Sporer ................... 346/25 |
| 5,549,740 A | 8/1996 | Takahashi et al. ........ 106/20 R |
| 5,640,187 A | 6/1997 | Kashiwazaki et al. ...... 347/101 |
| 5,698,017 A | 12/1997 | Sacripante et al. ...... 106/31.49 |
| 5,792,249 A | 8/1998 | Shirota et al. ......... 106/31.27 |
| 5,817,169 A | 10/1998 | Scaripante et al. ...... 106/31.43 |
| 5,847,738 A | 12/1998 | Tutt et al. ............. 347/101 |

FOREIGN PATENT DOCUMENTS

JP   2000289192   10/2000

Primary Examiner—Bruce H. Hess
(74) Attorney, Agent, or Firm—W. Bradley Haymond

(57) ABSTRACT

Production of a permanent ink-jet image with a fusible, wettable, colorant-containing toner and ink-jetted clear fluid.

28 Claims, 1 Drawing Sheet

INKJET PRINTED IMAGES WITH WETTABLE, FUSIBLE TONER

FIELD OF THE INVENTION

The present invention relates to ink-jetted clear fluids in combination with a toner with both colorant and hydrophilic polymers to produce a permanent ink-jet image. In particular, this invention relates to an ink system that utilizes the addition of specific toner/developers comprising hydrophilic polymers as well as colorant, with aqueous based ink-jet clear fluids. These dual systems produce a permanent image that is resistant to image degradation factors such as mechanical abrasion, light, water, and solvents such as the ones used in highlighter markers.

BACKGROUND OF THE INVENTION

Along with the computerization of offices in the 1980's came electronically controlled non-impact printers such as the ink jet and laser printers. Drop-on-demand inkjet printers can be piezo or thermal (bubble jet). In piezo ink jet systems, inkjetted droplets are ejected by an oscillating piezo crystal. However, the thermal ink jet dominates the drop-on-demand office ink jet market. In this system, rapid heating behind the inkjet nozzles cause a bubble of vapor to form in the fluid that is inkjetted. The resulting bubble expansion and fluid ejection from the inkjet printer cartridge causes printing to appear on the substrate.

Full-color inkjet printers are more common than color lasers and are much more economical. The main advantage of inkjet printers over lasers and other non-impact printing techniques include their low cost and simplicity. Thermal inkjet systems are capable of dispensing fluid rapidly and accurately. The technology of this and other inkjet systems are discussed in the *Chemistry and Technology of Printing and Imaging Systems*, edited by P. Gregory, published by Chapman & Hall, 1996. Representative thermal inkjet systems and cartridges are discussed in U.S. Pat. Nos. 4,500,895 to Buck et al., 4,513,298 to Scheu, and 4,794,409 to Cowger et al., which are all hereby incorporated by reference.

The technology of inkjet printers has undergone many changes and improvements since they first appeared. Research has been conducted to ensure that the images produced are of consistent high quality. Thus, it is important that the images be permanent by being waterfast, smearfast, smudgefast, run-fast, and the like when exposed to chemical or mechanical abrasion. Non-smearing of the image when portions of the printed page are highlighted with colored markers is of particular interest. Oftentimes, the image produced by the inkjet printer on paper is not satisfactorily fixed and smears, blurring the printed image when subjected to highlighting. This type of image is not regarded as permanent.

Image permanence is defined as transference of color from the substrate when the image printed thereon is subjected to chemical and mechanical abrasion. Highlighting is oftentimes the form of chemical and mechanical abrasion experienced. This transference of color is measured by optical density (mOD). More permanent images have lower milli-Optical Density (mOD) values.

Another desired feature of printed images is light fastness. As used herein, light fastness will mean that the images do not fade when exposed to light. Light fastness is another measure of permanence as used herein. Light fastness is measured by exposing printed images to intense light in light chambers (fadometers) and comparing print density before and after the exposure.

There have been many past attempts at improving the permanence of water-based inkjet printing systems. Included among these attempts are U.S. Pat. No. 5,549,740 to Takahashi et al., U.S. Pat. No. 5,640,187 to Kashiwakazi et al., and U.S. Pat. No. 5,792,249 to Shirota et al. which utilizes an additional or "fifth" pen to apply a colorless fluid on to the substrate. As will be seen in the comparative testing, the mOD values for the images printed thereon are quite high.

Another printing technology that is inherently more permanent than water-based inkjet are hot-melt inks. These materials are solid at room temperature and are similar to wax crayons. The colorants used in these materials are solvent dyes that are soluble in the ink vehicle or pigment dispersions. Like laser toners, these materials are incompatible with the fluids used in inkjet printing.

U.S. Pat. Nos. 5,817,169 and 5,698,017, both to Sacripante et al., disclose hot melt ink compositions which use oxazoline as a vehicle used for the colorant in a nonaqueous, hot melt inkjet ink. One of the advantages of this technology is that the waxy nature of the hot melt ink creates images that are more waterfast and may be successfully utilized on plain papers. This technology is in contrast with the instant invention, which utilizes an ordinary aqueous four-color ink pen set.

Another highly efficient printing system in common use currently is laser printers. In a laser printer or copier, light from a laser beam is used to discharge areas of a photoreceptor to create an electrostatic image of the page to be printed. The image is created by the printer controller, a dedicated computer in the printer, and is passed to the print engine. The print engine transcribes an array of dots created by the printer controller into a printed image. The print engine includes a laser scanning assembly, photoreceptor, toner hopper, developer unit, corotron, discharge lamp, fuser, paper transport, paper input feeders, and paper output trays.

The final stage of laser printing or copying is to fix toner onto the paper. Toner is very fine plastic powder that is transferred from the photoreceptor. Once transferred from the photoreceptor, it lies on the paper in a very thin coating with nothing to hold it in place. In order to fix the toner to the paper, it is heated by passing between a pair of very hot rollers, so that the plastic melts around the fibers of the paper and is "fused" into place. The image is now fixed permanently onto the paper.

The fuser of a typical laser printer is of particular interest to the printing system of this invention. In these systems, fusing or melting the polymeric resin in which the colorant is embedded converts the discrete toner particles into an amorphous film. This film becomes the permanent image that results in electrophotographic copy or laser printed copy. However, the laser printer toners are incompatible with water. Since most inkjet materials are water-based, it is not possible to use laser toners in inkjet printers, and, therefore, Inkjet technology has not yet found a way to make the printed image permanent.

U.S. Pat. No. 4,943,816 to Sporer, discloses the use of a dye-less fluid for latent imaging. The dye and ink are omitted and a colorless marking fluid is used to create a latent image to be developed in a subsequent step. Omitting the dye is believed to prolong the printhead life.

U.S. Pat. No. 4,312,268, to King et al., describes a mechanical transfer of clear or colored toner to a wet image.

The mechanical transfer is not by electrostatic transfer. The powdered material adheres to the wet surfaces and the rest falls down into the housing.

U.S. Pat. No. 5,847,738, to Tutt, describes the application of a total overcoat over inkjet prints as a separate process in a sequential fashion.

Accordingly, a need remains for a printing system using water-based inkjet technology, yet, will produce permanent laser-like images. These permanent images will be consistent and stable with respect to a variety of printed substrates. An ideal situation would be combining the convenience and safety of aqueous inkjet inks with the permanence of electrophotographic copies. The present invention satisfies this in a unique manner, which is described herein.

SUMMARY OF THE INVENTION

The present invention relates to a method for creating a permanent inkjet image comprising:

(a) ink-jet printing a clear fluid onto a substrate;

(b) exposing said substrate from (a) to a toner comprising colorant and hydrophilic polymers.

The present invention further relates to a method for creating a permanent inkjet image comprising:

(a) exposing a substrate to a toner comprising colorant and hydrophilic polymers;

(b) ink-jet printing a clear fluid onto said substrate from (a).

The present invention also relates to an image on a substrate comprising discrete areas of inkjetted clear fluid and electrostatic toner comprising hydrophilic polymers, the image being fused onto the substrate and discrete areas substantially free of said inkjet ink and electrostatic toner.

The present invention additionally relates to a printing system comprising:

an inkjet printing engine for inkjetting clear fluid;

a developer mechanism for applying electrostatic toner comprising hydrophilic monomers;

a charging unit; and a fuser.

DETAILED DESCRIPTION OF THE PREFERRED EMBODIMENT

Figure 1:
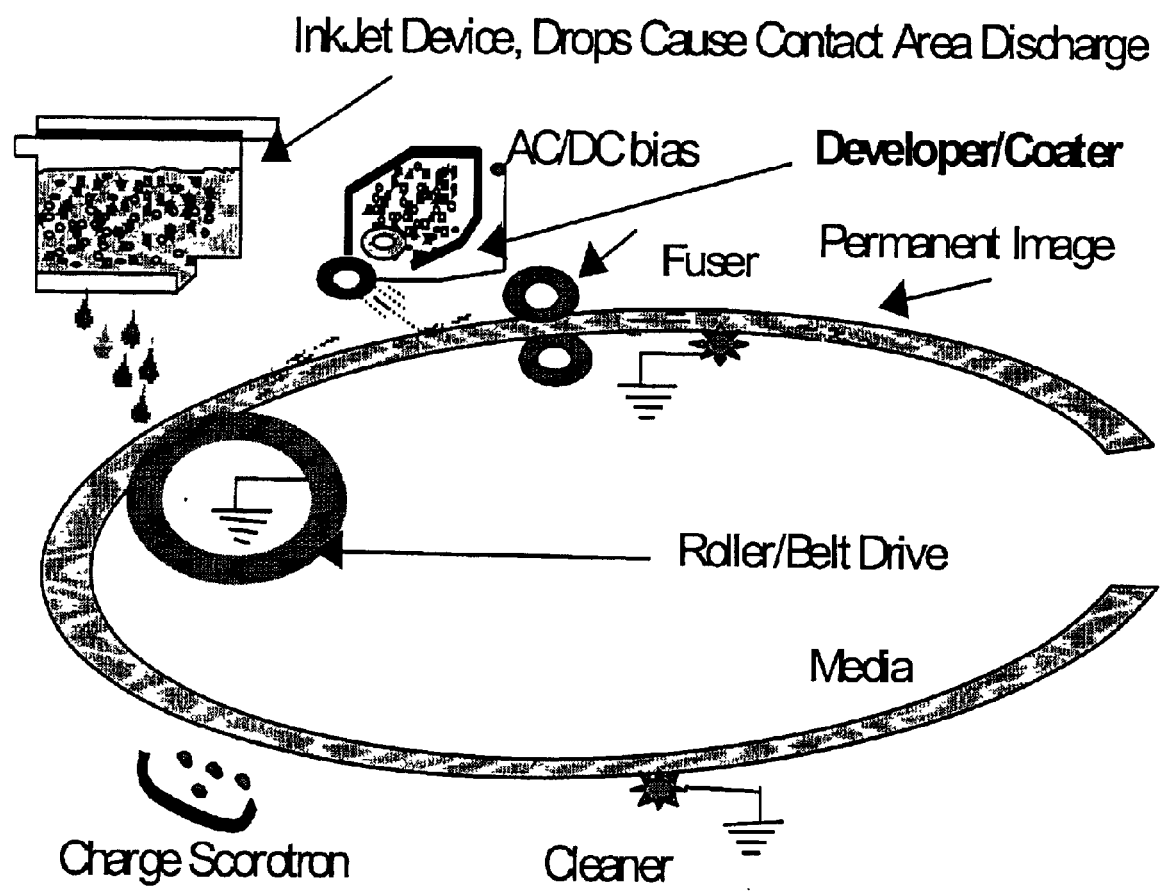
FIG. 1 is a schematic of the printing method according to the present invention.

As can be seen in FIG. 1, the following steps are utilized, combining inkjet printing and electrostatic toners to produce a permanent image without altering the feel or coating on the rest of the substrate. Thus, discrete areas of the substrate contain ink and toner and discrete areas are substantially (cannot be visually or tactually detected with the hand) free of ink and toner.

Charging the Media

The media is preferably charged to a given polarity prior to printing. In the charging step, the media is covered with ions of a selected polarity using a high voltage wire, grid, or charge roller. The media should have the same polarity as the toner/developer material. Useful devices for charging the media include the use of a scorotron or a corotron. Charging the media is well known in the art of electrophotography. See U.S. Pat. Nos. 4,478,870; 4,423,951, and 4,041,312, hereby incorporated by reference.

Inkjet printer

Ink-jet printing is a non-impact printing process in which droplets of ink or other fluid are deposited on print media, such as paper, transparency film, or textiles. Ink-jet printers are generally lower in cost and offer high quality output compared to other types of printers. Ink-jet printing involves the ejection of fine droplets of ink or other fluid onto print media in response to electrical signals generated by a microprocessor. In a general embodiment of the present invention, the inkjetted fluid is a clear fluid containing no colorants. Two options for achieving fluid droplet ejection in ink-jet printing are: thermally and piezoelectrically. In thermal ink-jet printing, the energy for drop ejection is generated by electrically-heated resistor elements, which heat up rapidly in response to electrical signals from a microprocessor to create a vapor bubble, resulting in the expulsion of ink or other fluid through nozzles associated with the resistor elements. In piezoelectric ink-jet printing, the droplets are ejected due to the vibrations of piezoelectric crystals, again, in response to electrical signals generated by the microprocessor. The ejection of droplets in a particular order forms alphanumeric characters, area fills, and other patterns on the print medium.

Ink-jet printers and inkjet print engines are well known in the art. Representative thermal inkjet systems and cartridges are discussed in U.S. Pat. Nos. 4,500,895 to Buck et al., 4,513,298 to Scheu, and 4,794,409 to Cowger et al., which are all hereby incorporated by reference.

Developing Mechanism

The toner in a preferred embodiment herein is a dry toner having a thermoplastic binding component. Other components may be added to the toner formulation to enhance certain properties or performance characteristics of the toners. These include additives to control the rate and level of charge and additives for enhancing flow. Oil is sometimes added in the fusing process to inhibit adhesion of the toner to the fuser rollers.

In a preferred embodiment of this invention, the toner is selectively attracted to the inkjetted fluid on the media surface, which has acted to neutralize the polarity or charge on the media. The media may be either positively or negatively charged, and the toner system similarly should contain the same charge. In the transfer step, media, most often in the form of a sheet of paper, is given an electrostatic charge the same as that of the toner, the media is then subjected to inkjetting which causes the areas exposed to the inkjetted fluid to lose its charge. The media is then passed along in close proximity to the developer surface to transfer toner and, consequently, the toner is transferred only to the areas exposed to inkjetted fluid. Following transfer of the toner, the media is passed between a pair of fuser rollers. The pressure and heat of the rollers fixes the toner in the media.

In a preferred embodiment of this invention, the developing mechanism that acts to transfer the toner may consist of a charged roller, a clear toner hopper, stirrer, wiper blade, and a source of AC/DC voltage biases. The toners or precursors used in this invention are polymers, charge control agents, stabilizers, and other components typically found in electrophotographic toners. Such polymers and materials are commercially available from Clariant, Image polymers, Sybron, Zeneca and others.

Among the properties of interest for application of some of the developer polymers useful herein include glass transition temperature (Tg) and Melt Index (MI). As used herein, glass transition temperature (Tg) will mean the transition that occurs when a liquid is cooled to an amorphous or glassy solid. It also may be the change in an amorphous region of a partially crystalline polymer from a viscous, rubbery state to a hard or brittle one brought about by change in temperature. In this invention, the materials which are used to improve permanence of the images produced by inkjet printing fluid have a Tg that may range from about 50 to about 180 degrees C. A more preferred range of glass transition temperatures will range from about 50 to about 90 degrees C. Melt index (MI) values for the instant materials may range from about 400 to about 3000 grams/10 minutes. A more preferred range may be from about 1800 to about 2500 grams/10 minutes. A still more preferred range is from about 2000 to about 2250 g/10 min.

Presented herein are representative examples of syntheses of fusible, wettable polymers that provide permanence to the images formed by the materials and processes of the instant invention. Examples of such fusible, wettable polymers are (but they are not limited to): ~5000 MW Chitosan lactate, polyacrylic acid, PolyStyrene-Maleic Anhydride derivatives, Rosin-Maleic anhydride derivatives, PolyAbiatic acid derivatives, polyamides, polyolefin-acrylates, and styrenated polyacrylates. Other non-limiting examples include polymers having hydrophilic surface groups such as carboxylate, PEG, sulfonate, quaternatry ammonium, and phosphonium. In a most preferred embodiment, the wettable hydrophilic polymers are water dispersible and have a size of from 5 to 10 microns.

A variety of colorants as described below can be used to produce color in the toners.

Pigments—When a pigment is used as a coloring material in the ink composition of the present invention, the amount of pigment used is within the range from about 0.5 to about 20 weight percent. A more preferable range of pigment ranges from about 1 to about 15% by weight, still more preferably is a range of from about 2% to about 12% by wt.

An example of a pigment used for black ink is carbon black. The carbon black may be produced by either a furnace or channel method. The primary particle size of this material ranges from 15 to 40 $\mu$m, specific surface area is 50 to 300 m2/g, and has oil absorption from 40 to 150 ml/100 g, the volatile component is 0.5 to 10%, and the pH value may range from 2 to 9. Examples of suitable commercially available carbon blacks include No. 2300, No. 900, MCF88, No. 33, No. 40, No. 45, No. 52, MA&, MA8, No. 2200B, Raven 1255, Regal 400R, Regal 330R, Regal 660 R, Mogul L, Color Black FW1, Color Black FW18, Color Black S170, Color Black S150, Printex 35, and Printex U.

In this invention, the black colorants that are employed include Novofil Black BB-03, and Hostafine Black TS. The Novafil material is a pigment that is approximately 27% pigment dispersion based on anionic dispersing agents. It contains C.I. Pigment Black 7, carbon black and is an ultrafine pigment dispersion suitable for all water based inkjet application. These pigments are available from Clariant Corp., Coventry, R.I.

Hostafine Black TS contains hydrophilic ultrafine pigment dispersions based on non-ionic dispersing and wetting agents. It contains carbon black and has a pigment concentration of 33%.

Other black colorants, which may be used, include those listed in the Color Index and in Textile Chemist and Colorist reference publications. Water-soluble black colorants are commercially available from colorant vendors such as Cabot Corporation, Orient Chemical, and other manufacturers. Surface modified colorants from these manufacturers are initially water insoluble colorants which, by certain modifications, are solubilized or stabilized as fine dispersions in water to prevent agglomeration. See U.S. Pat. Nos. 5,707,432; 5,630,868; 5,571,311; and 5,554,739 for a discussion of modified carbon black pigments and methods of attaching functionalized groups to aid in their solubility.

Examples of pigments used for a yellow ink include C.I. Pigment Yellow 1, C.I. Pigment Yellow 2, C.I. Pigment Yellow 3, C.I. Pigment Yellow 13, C.I. Pigment Yellow 16, C.I. Pigment Yellow 83, and the like. Examples of pigments used for magenta ink include C.I. Pigment Red 5, C.I. Pigment Red 7, C.I. Pigment Red 12, C.I. Pigment Red 48 (ca), C.I. Pigment Red 48 (mn), C.I. Pigment Red 57 (Ca), C.I. Pigment Red 112, C.I. Pigment Red 122, and the like. Examples of pigments used for a cyan include C.I. Pigment Blue 1, C.I. Pigment Blue 2, C.I. Pigment Blue 3, C.I. Pigment Blue 15:3, C.I. Pigment Blue 16, C.I. Pigment Blue 22, C.I. Vat Blue 4, C.I. Vat Blue 6, and the like. Pigments whose performance properties are satisfactory when formulated for the present invention are considered to be within its scope.

In the instant invention, colorants used include Hostafine Rubine F6B and Hostafine Blue B2G available from Clariant, Coventry, R.I. Hostafines are hydrophilic ultrafine pigment dispersions based on nonionic dispersing and wetting agents, available in all colors. In this disclosure, Hostafine Rubine F6B is magenta with a 40% pigment content. Hostafine Blue B2G is blue with 40% pigment as well. These colorants are manufactured for suitability with water-based inkjet inks.

Any pigment, dye, or pigment-resin system available and compatible with the other formulated ingredients of the fusible material of this invention may be used as colorants. An important factor that the formulator must keep in mind is thermal instability exhibited by certain tri- and tetrakis-azo dyes. Such thermal instability may lead to charring of insoluble deposits (kogation), which is to be avoided.

Dyes—Dyes, whether water-soluble or water-insoluble, may be employed in the practice of the present invention. Examples of water-soluble dyes include the sulfonate and carboxylate dyes, specifically, those that are commonly employed in ink-jet printing. Specific examples include: Sulforhodamine B (sulfonate), Acid Blue 113 (sulfonate), Acid Blue 29 (sulfonate), Acid Red 4 (sulfonate), Rose Bengal (carboxylate), Acid Yellow 17 (sulfonate), Acid Yellow 29 (sulfonate), Acid Yellow 42 (sulfonate), Acridine Yellow G (sulfonate), Nitro Blue Tetrazolium Chloride Monohydrate or Nitro BT, Rhodamine 6G, Rhodamine 123, Rhodamine B, Rhodamine B Isocyanate, Safranine O, Azure B, Azure B Eosinate, Basic Blue 47, Basic Blue 66, Thioflacin T (Basic Yellow 1), and Auramine O (Basic Yellow 2), all available from Aldrich Chemical Company. Examples of water-insoluble dyes include azo, xanthene, methine, polymethine, and anthroquinone dyes. Specific examples of water-insoluble dyes include Ciba-Geigy Orasol Blue GN, Ciba-Geigy Orasol Pink, and Ciba-Geigy Orasol Yellow.

The fixing fluid formulation comprises a colorant plus a vehicle. A typical formulation useful in the practice of this invention includes one or more co-solvents, present from 0 to 50 weight percent, one or more water-soluble surfactants, present in about 0.1 to 40 weight percent, one or more high molecular weight colloids present in from 0 to about 3 weight percent. The balance of the formulation is purified water. One or more co-solvents may be added to the formulation of the ink of this invention. Classes of co-solvents include, but are not limited to, aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs of polyethylene glycol alkyl ethers, N-alkyl caprolactams, unsubstituted caprolactams, both substituted and unsubstituted formamides, both substituted and unsubstituted acetamides, and the like.

In the present applicant's previous U.S. patent application Ser. No. 09/629,784 filed Jul. 31, 2000, several fusible toner materials are disclosed. Most of these toner materials are hydrophobic polymers and therefore not "wettable". They are present in electrophotography as small, discrete grains that outline the image on a substrate prior to fusion. As such, these materials have been incompatible with and not viable for use in water-based inkjet inks. In contrast, among the fusible wettable polymers useable in the present invention, several are hydrophilic, wettable analogs of the hydrophobic toners taught in Ser. No. 09/629,784.

Fuser Mechanism

The printing system of this invention includes a printing apparatus that is equipped with suitable heating means. Heat fusion is most often the way that the image formed by toner particles used in electrophotography are fixed to the printed substrate. Most systems employ a heated roller to fix the image although any other means of supplying heat is included within the scope of this invention.

The heated roller is often a rubber roller impregnated with silicone oil which is preheated to about 90° C. It may also be a metal roller heated with incandescent light or a lamp equipped with a reflector. Certain laser printers employ a ceramic heating element in the fusion stage. When the copier or printer is switched on, waiting time until the machine is ready to use is associated with heating the roller.

The heating means is designed to melt (or fuse) the toner on to the substrate. In high speed systems, flash fusion may be used. Flash fusion involves the use of heated lamps with a specific heat output are used to rapidly heat the toner which then adheres to the substrate. Fusers are commercially available from such companies that manufacture laser printers such as Hewlett-Packard, Canon, Ricoh, and Panasonic. In all cases, the toner particles used in Electrophotography are hydrophobic.

A typical laser printer commonly available is the Hewlett-Packard Laser Jet 4L Printer. In the fusing stage, toner is fused into the substrate by heat and pressure to produce a permanent image. The substrate (usually paper) passes between a ceramic heating element protected by a thin Teflon sleeve and a soft pressure roller. This melts the toner and presses it into the substrate. Other laser printers use a halogen heating lamp and require frequent warm-up periods to maintain a minimum standby temperature.

EXAMPLES

Example 1

Preparation of a Class A Fusible Toners Using Methyl Methacrylate and Butyl Acrylate A 2-liter jacketed reaction vessel is charged with water (787.65 g) purified using milliQ system of purified water manufactured by Millipore Corporation. The reactor is heated to 60° C. under positive pressure of nitrogen. A syringe is filled with 106.64 g of 1.49% aqueous solution of VA 440 (2,2'-Azobis(N,N'-dimethyleneisobutyramidine) dihydrochloride, (WaKo Pure Chemical Industries Ltd., Japan). A graduated addition funnel is filled with Noigen 10 (Montello Company, Tulsa, Okla.), (5.04 g), butyl acrylate (40.01 g), methyl methacrylate (60.10 g), and iso octyl mercaptopropionate (0.78 g) and is fitted onto the reactor. One tenth of each of the solutions in both the syringe and the graduated cylinder is added every 15 minutes until the addition is complete.

Heat is supplied and stirring is continued for 7 hours after the additions are complete. The resulting emulsion is then filtered through a sequence of filters according to the following procedures. Four 11 $\mu$m Whatman filter papers are used to filter 500 ml of solutions. Six 2.7 $\mu$m GF/D Whatman filters are needed to filter the entire solution. Water was evaporated off the resulting milky dispersion to furnish white powder of the toner material. Subsequently the powder was ground using a choice of air jet milling or cryogenic or mechanical grinding, and classified to produce powder of a 10$\mu$ average particle size. The glass transition temperature of Polymer A is 25–28° C. The toners were prepared by using normal methods for preparing electrography toners in which colorants are added to the polymer followed by mixing by grinding in ball mill with or without a liquid, high shear mixing under heat, or co-extruding under heat. Additionally, the materials are ground by cryogenic or air jetmilling as necessary, and classified as described above. Further additives such as copy charge agents available from Clariant Corporation were added for electrostatic deposition. Pigment Carbon Black FW18, available from Degussa-Hules Corporation, Pigment Red 122 available form Sun Chemical, or Pigment Blue 15, available from Sun Chemical, Amelia. Ohio, are used to prepare Black, Magenta and Blue toners respectively.

Example 2

Preparation of Class B Colored Toners Using Styrene and Methyl Methacrylate

Another fusible polymer is synthesized using styrene, methyl methacrylate, and a polymerizable surfactant in the following manner. A 2L jacketed reaction vessel is heated to 60° C. under nitrogen and charged with 393.4 g of water purified using MilliQ system. Organic components Noigen 10 (2.5 g), styrene (30 g), methyl methacrylate (20 g), and CTA (iso octyl mercaptopropionate) (0.375 g) are transferred to a glass syringe. The initiator solution is prepared by dissolving VA 440 (2,2'-Azobis(N,N'-dimethyleneisobutyramidine) dihydrochloride (0.796 g) in MilliQ water (52.9 g). The reaction is performed by addition of 10% of each of the solutions every 15 minutes. The heating and stirring is continued for 7 hours after additions are complete. The emulsion is filtered using following filters, 4, 11 $\mu$m Whatman, 3, 20 um msi with Whatman gf/d 2.7 um pre-filter, 1, 5 $\mu$m msi with Whatman gf/d 2.7 um prefilter to give a polymer emulsion. Water was evaporated off the resulting milky dispersion to furnish white powder of the toner material. Subsequently the powder was ground using a choice of air jet milling or cryogenic or mechanical grinding, and classified to produce powder of a 10$\mu$ average particle size. The glass transition temperature of Polymer B is 95–105° C. The toners were prepared by using normal methods for preparing electrography toners in which colorants are added to the polymer followed by mixing by grinding in ball mill with or without a liquid, high shear mixing under heat, or co-extruding under heat. Additionally, the materials are ground by cryogenic or air jetmilling if necessary, and classified as described above. Pigment Carbon Black FW18, available from Degussa-Hules Corporation, Pigment Red 122 available form Sun Chemical, or Pigment Blue 15, available from Sun Chemical, Amelia, Ohio, are used to prepare Black, Magenta and Blue toners respectively.

Example 3
Testing Compositions

The results in the tables in Example 6 shows the type of toners used to test the invention using polymers synthesized by the above procedures. All the clear fluids are filtered through 5 micron nylon filters available from Micron Separations, Inc. The clear immobilizing fluids are filled in HP 2000C pens and warmed to 60° C. before printing. The toners were deposited using a cartridge from HPLaserjet 4L laser printers, modified to work in series with a HP2000C inkjet printer. The following formulation of immobilizing fluid was used in the experiments.

| | |
|---|---|
| 2-Pyrrolidine | 10.0 g |
| 1,5 Pentanediol | 10.0 g |
| Poly(2-ethyl-2oxazoline) | 5.0 g |
| Water | 64.5 g |
| Multranol 4012 | 0.5 g |
| TetraEthylene Glycol | 10.0 g |

In method A, the toner was deposited immediately after the inkjet printing by a suitable means, either mechanical or electrostatic, and fused. In method B of printing the toner was deposited before printing by a suitable means, followed by inkjet printing, and nonwetted toner was removed from print, either by electrostatic or mechanical means and then the prints were fused to produce permanent images. The print quality and definition was much improved as compared to hydrophobic toners.

Example 4
Permanence Testing: Procedures

The smear resistance which serves as a measure of mechanical and chemical (solvent) abrasion is measured by the amount of transfer of color in milli optical density (mOD) units measured using MacBeth RD918 optical density meter (available from MacBeth, a division of Kollmorgen Instruments Corporation, New Windsor, N.Y.). After running basic (fluorescent) highlighters twice over a set of bars printed using an ink jet printer containing the respective inks.

The permanence of images produced by electrophotography (laser printing or copying), show the least transfer and lowest mOD numbers. Since the MacBeth instrument reports mOD units of transferred color in this experiment, the lower number indicates less transfer. Therefore, the lower numbers indicate better performance. The markers used for this purpose are available from Sanford corporation or any office supply center under the name 'Major Accent' (read through highlighting marker) and 'fluorescent' (alkaline highlighting marker).

The tables below show comparative values of some of the commercially available transfer obtained from such smear tests.

As can be seen in Tables 1–3, both polymers A and B of the instant invention produced comparable results. The two papers used were Gilbert bond (GBND) and Stora Papyrus MultiCopy (PMCY), available commercially.

Paper's propensity to absorb moisture because of the hydrophilic nature of the cellulose from which it is made has considerable implications for its behavior with various ink formulations. Paper in an ambient relative humidity of 50% can contain up to eight weight percent water. This moisture can become the controlling factor in the performance of the paper as a substrate in both electophotography and inkjet printing.

Example 5

Results of Smear Resistance Measurement (Values in mOD)

TABLE 1

Comparison of Commercial Cyan Inkjet Inks and Cyan Toners of Invention Process (Numbers are in mOD units)

| | GBND | PMCY |
|---|---|---|
| C1893A Commercial Cyan Ink for Design Jet | 551 | 544 |
| Class A Toner with Blue 15 and Method A | 0 | 10 |
| Class A Toner with Blue 15 and Method B | 0 | 5 |
| Class B Toner with Blue 15 and Method A | 0 | 5 |
| Class B Toner with Blue 15 and Method B | 0 | 8 |

TABLE 2

Comparison of Commercial magenta Toners and Invention Process (Numbers are in mOD units)

| | GBND | PMCY |
|---|---|---|
| C1894A Commercial Magenta Ink for DesignJet | 385 | 684 |
| Class A Toner with Red122 and Method A | 0 | 6 |
| Class A Toner with Red 122 and Method B | 0 | 5 |
| Class B Toner with Red 122 and Method A | 0 | 5 |
| Class B Toner with Red122 and Method B | 0 | 8 |

TABLE 3

Comparison of Commercial Black Inkjet Inks and Toners of Invention Process (Numbers are in mOD units)

| | GBND | PMCY |
|---|---|---|
| HP51645A Commercial Black Ink for 800 | 486 | 765 |
| Class A Toner with CB FW 18 and Method A | 0 | 10 |
| Class A Toner with CB FW18 and Method B | 0 | 12 |
| Class B Toner with CB FW 18 and Method A | 0 | 5 |
| Class B Toner with CB FW18 and Method B | 0 | 8 |

TABLE 4

| Laser Printer Testing | | | | | | | | | |
|---|---|---|---|---|---|---|---|---|---|
| Alkaline | | | | | Acid | | | | |
| CDCY | GBND | PMCY | PNAT | UCJT | CDCY | GBND | PMCY | PNAT | UCJT |
| NA 1 | NA 4 | NA 0 | NA 2 | NA 0 | NA 0 | NA 0 | NA 0 | NA 0 | NA 0 |

TABLE 5

| Mita Laser Copier Testing |||||||||||
|---|---|---|---|---|---|---|---|---|---|
| Alkaline ||||| Acid |||||
| CDCY | GBND | PMCY | PNAT | UCJT | CDCY | GBND | PMCY | PNAT | UCJT |
| NA | NA | NA | NA | NA | NA | NA | NA | NA | NA |
| 0 | 1 | 0 | 0 | 0 | 0 | 0 | 0 | 0 | 0 |

It can be seen that the permanence testing results of the instant invention, using a variety of hydrophilic toners (Tables 1–5) exhibit much better permanence as compared to images produced by other inkjet printers, and much closer to electrographic printers. The mOD values are for current state of the art inkjet printers are consistently greater than 300.

It is clear that this invention process and materials combines the permanence of electrophotography with the desirable features of inkjet technology.

What is claimed is:

1. A method for creating a permanent inkjet image comprising:
   (a) ink-jet printing a clear fluid containing no colorant onto a substrate;
   (b) exposing said substrate from (a) to a toner comprising colorant and hydrophilic polymers.

2. The method for creating a permanent inkjet image of claim 1, wherein the substrate of (a) is charged with a given polarity; and wherein the substrate of (b) is subjected to fusing.

3. The method of claim 1 wherein a thermal ink-jet printer is used to ink-jet print.

4. The method of claim 1 wherein a piezoelectric printer is used to ink-jet print.

5. The method of claim 1 wherein said toner has a Tg from about 50 to about 180° C.

6. The method of Claim 5 wherein said toner has a Tg from about 50 to about 90° C.

7. The method of Claim 1 wherein said toner has a MI from about 400 to about 3000 grams/10 minutes.

8. The method of Claim 1 wherein said toner has a MI from about 1800 to about 2500 grams/10 minutes.

9. The method of Claim 8 wherein said toner has a MI from about 2000 to about 2250 grams/10 minutes.

10. The method of claim 1 wherein said hydrophilic polymers are selected from the group consisting of Chitosan lactate, polyacrylic acid, PolyStyrene-Maleic Anhydride derivatives, Rosin-Maleic anhydride derivatives, PolyAbiatic acid derivatives, polyamides, polyolefin-acrylates, and styrenated polyacrylates.

11. The method of claim 10 wherein said hydrophilic polymers have a molecular weight of approximately 5000.

12. The method of claim 10 wherein said hydrophilic polymers have ionic or hydrophilic surface groups.

13. The method of claim 12 wherein said ionic or hydrophilic surface groups are selected from the group consistiting of carboxylate, PEG, sulfonate, quaternary ammonium, and phosphonium.

14. The method of claim 1 wherein said hydrophilic polymers are water dispersible and have a size of from 5 to 10 microns.

15. A method for creating a permanent inkjet image comprising:
   (a) exposing a substrate to a toner comprising colorant and hydrophilic polymers;
   (b) ink-jet printing a clear fluid containing no colorant onto said substrate from (a).

16. The method for creating a permanent inkjet image of claim 15, wherein the substrate of (a) is charged with a given polarity; and wherein the substrate of (b) is subjected to fusing.

17. The method of claim 15 wherein a thermal ink-jet printer is used to ink-jet print.

18. The method of claim 15 wherein a piezoelectric printer is used to ink-jet print.

19. The method of claim 15 wherein said toner has a Tg from about 50 to about 180° C.

20. The method of Claim 15 wherein said toner has a Tg from about 50 to about 90° C.

21. The method of Claim 15 wherein said toner has a MI from about 400 to about 3000 grams/10 minutes.

22. The method of Claim 15 wherein said toner has a MI from about 1800 to about 2500 grams/10 minutes.

23. The method of Claim 15 wherein said toner has a MI from about 2000 to about 2250 g/10 min.

24. The method of claim 15 wherein said hydrophilic polymers are selected from the group consisting of Chitosan lactate, polyacrylic acid, PolyStyrene-Maleic Anhydride derivatives, Rosin-Maleic anhydride derivatives, PolyAbiatic acid derivatives, polyamides, polyolefin-acrylates, and styrenated polyacrylates.

25. The method of claim 24 wherein said hydrophilic polymers have a molecular weight of approximately 5000.

26. The method of claim 15 wherein said hydrophilic polymers has a ionic or hydrophilic surface groups.

27. The method of claim 26 wherein said ionic or hydrophilic surface groups are selected from the group consisting of carboxylate, PEG, sulfonate, quaternary ammonium, and phosphonium.

28. The method of claim 15 wherein said hydrophilic polymers are water dispersible and have a size of from 5 to 10 microns. 1 minutes.

* * * * *